June 4, 1935.  T. C. VAN DEGRIFT  2,003,794
GEAR SHIFT MECHANISM
Filed Jan. 20, 1932    2 Sheets-Sheet 1

Inventor
Thomas C. Van Degrift
By Blackmore, Spencer & Flint
Attorneys

Patented June 4, 1935

2,003,794

UNITED STATES PATENT OFFICE 2,003,794

GEAR SHIFT MECHANISM

Thomas C. Van Degrift, Detroit, Mich., assignor, by mesne assignments, to General Motors Corporation, Detroit, Mich., a corporation of Delaware Application January 20, 1932, Serial No. 587,643

9 Claims. (Cl. 74—339)

This invention relates to change speed transmission and has been designed as an improvement in such a mechanism for use on power driven vehicles.

The invention more particularly relates to a change speed transmission wherein there are used friction clutches to effect synchronization prior to the engagement of locking teeth for certain speed ratios.

A primary object of the invention is to improve the operation of gear shift mechanism wherein friction clutch members and jaw teeth are successively engaged.

Another object of the invention is to provide for a relatively high mechanical advantage during that part of the shift in which the friction clutch members are being engaged, and a relatively lower mechanical advantage for the latter part of the shift movement during which the toothed members are being engaged.

Other objects and advantages will be understood from the following description.

In the accompanying drawings—

Figure 1:
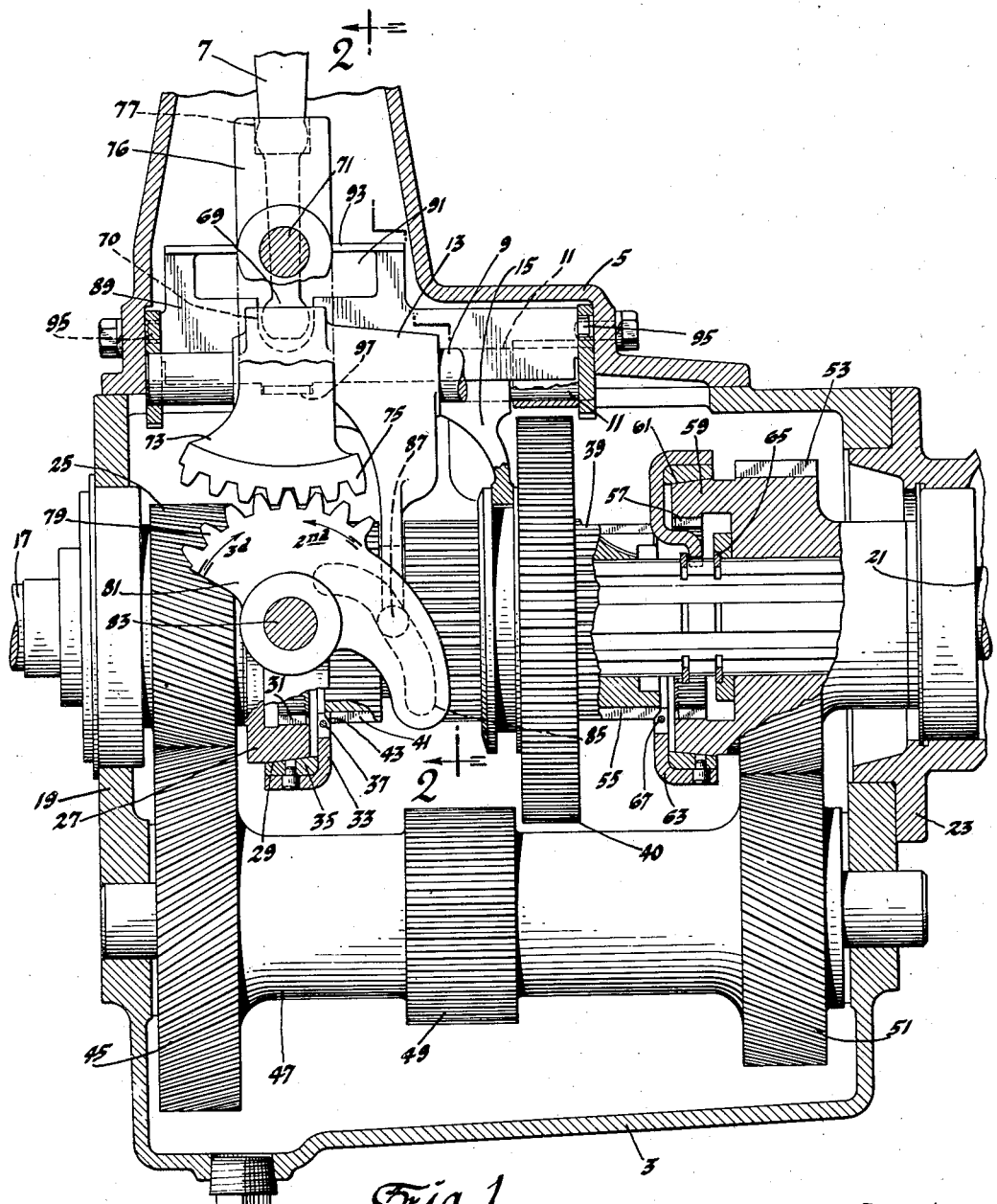
Fig. 1 is a longitudinal section through the improved change speed mechanism.
Figure 2:
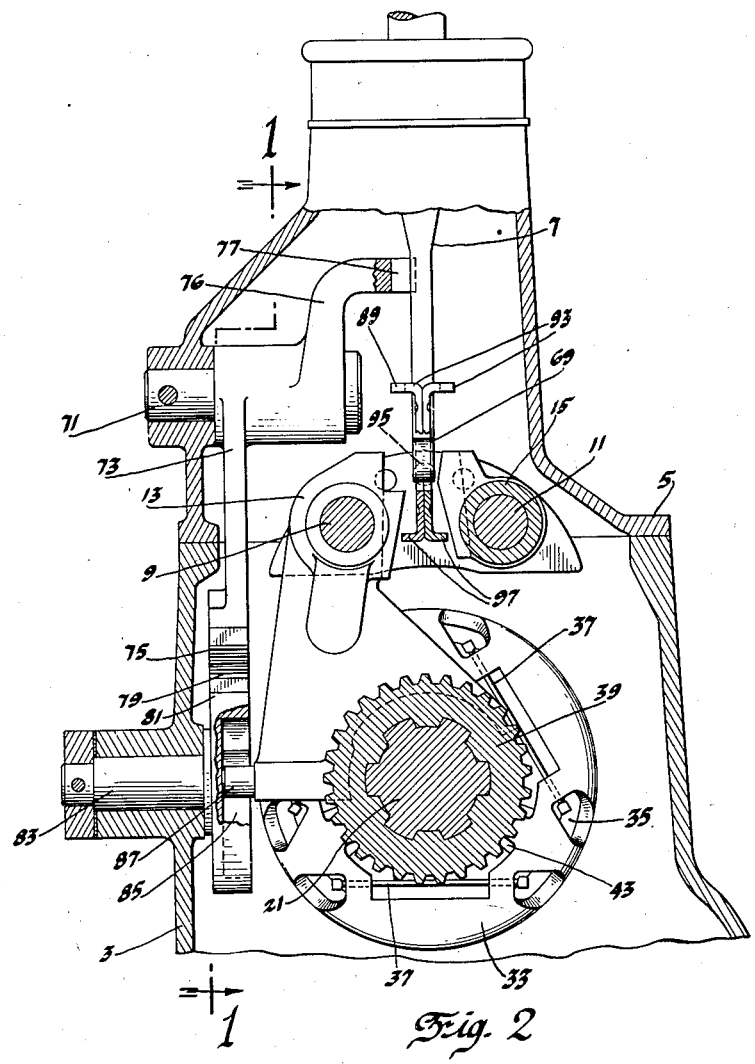
Fig. 2 is a section on line 2—2 of Fig. 1.

Referring by reference characters to the drawings, numeral 3 represents a housing for gear shift mechanism and 5 is the cover within which is shown a part of the gear shift lever 7 below its fulcrum (not shown). At 9 and 11 are rods upon which slide shift forks 13 and 15 respectively for reciprocating clutches and gears to make the several shifts to afford the several transmission driving ratios.

At 17 is the driving shaft rotatably supported by bearings (not shown) in the front wall 19 of the housing. The driven shaft 21 is similarly supported in the rear end wall 23. The driven shaft 21 is splined and extends toward the front wall 19. Its front end may be rotatably supported in the recessed end of the driving shaft in the usual manner. Inasmuch as this is a conventional construction it has not been illustrated in the drawings. On the driving shaft 17 is a gear 25 and a flange 27. The flange 27 has an external conical friction face 29 and also has internal teeth 31. A friction drum 33 is provided with a conical face 35 to engage face 29. This friction drum has wires 37 arranged as cords for a purpose to be explained. Slidable on the spline shaft 21 is a double clutch 39. This clutch is to be reciprocated by fork 13. It has teeth 41 to engage teeth 31. These teeth 41 first engage the wires 37 and force the drum 33 toward the cooperating friction member 29 and bring about frictional engagement between the frictional clutch faces. The frictional engagement between these faces produces synchronization in the usual way prior to the engagement of the teeth 41 with the teeth 31. As in devices of this kind the first engagement of the faces 33 and 29 causes a rotating movement of the friction drum 33 together with the flange 27 which is sufficient to cause engagement of cam faces 43 on the clutch 39 and the friction drum 33. The engagement of these cam faces prevents the further reciprocation of clutch 39 until synchronization is completed. The clash of the clutch teeth is therefore prevented. When the teeth 41 and 31 become engaged a drive in high speed through the jaw teeth is effected.

Gear 25 is in mesh with a gear 45 on a countershaft 47. This countershaft is rotatably supported in the front and rear walls of the transmission housing. It has a low and reverse driving gear 49 between its ends and a second speed driving gear 51 at its rear end adjacent the wall of the housing. The last named gear 51 is in constant mesh with a gear 53 rotatably mounted on the driven shaft 21. For driving in second speed it is necessary to clutch gear 53 to the driven shaft 21. To that end there are used friction faces and jaw teeth as already described for driving at high speed. The double clutch member 39 has teeth 55 which engage internal teeth 57 on a flange 59 integral with gear 53. Outside the flange is a conical friction surface 61. As before a friction drum 63 is mounted for limited movement on shaft 21 by retaining means 65. It is also provided with wires 67 as before. The rearward sliding of clutch 39 is accompanied by engagement of its teeth with the wire 67. This causes a movement to the rear of the drum 63 with an engagement of the friction face of the drum with the friction face 61 on the flange 59. Thereafter and after the friction between the friction faces has effected synchronization, the cam faces between the interengaging parts of the drum and the clutch member 39 may be overcome and the jaw teeth 55 and 57 engage. As this operation is one which is well known in connection with such synchronizing transmissions, there is no occasion for a more detailed description.

The low speed and reverse driving gear 49 is in constant mesh with a reverse idler, not shown. Slidable around the external toothed surface of clutch 39 is a gear 40 which is to be reciprocated to engage either countershaft gear 49 or the idler, not shown, driven thereby. The shifting of gear 40 is to provide low speed and reverse driving. The reciprocation is accomplished by a movement of fork 15. For shifting into low and reverse, the lever 7 is first rocked transversely on its pivot so that its lower end 69 may enter a recess 70 in the head of fork 15. Fore and aft reciprocation then effects engagement of the gear 40 either with the low speed driving gear 49 or with the reverse idler driven thereby.

For shifting into high speed or into second speed the fork 13 is employed. As explained above each of these shifts first renders active a friction clutch and thereafter causes the engagement of jaw teeth. The engagement of the conical friction clutch members carried by parts which are rotating at unequal rates requires a greater effort than the later effort of engaging the jaw teeth. It is desirable, if not necessary, that the shift for high speed and second speed should not be through a greater range of movement than the movement required for shifts into low and reverse, and also desirable that a uniform movement of the shift lever shall be accompanied by a higher mechanical advantage when effecting the engagement of the friction clutches than when engaging the jaw teeth.

To secure the above desired result the following structure is employed. A pivot 71 carried by the housing rotatably supports a sector 73 having teeth 75. This first sector has an upper extension 76 provided with a notch 77 to engage the shift lever at a point considerably above its point of engagement with fork 15. The teeth 75 of sector 73 engage teeth 79 of a cam sector 81. This latter is pivoted at 83 to the housing and has a cam slot 85 into which projects a pin 87 extending from the fork 13. The arrows on the cam sector in Fig. 1 indicate the direction of rotation for high speed and second speed shifting. The shape of the cam slot 85 is such that the pin 87 and the shift fork which carries it are moved to make the necessary shifts as will be obvious. Furthermore, the shape of the walls of the slot may be made as desired.

As shown in Fig. 1 the clutch member 39 and the fork 13 are in the neutral position. It will also be seen that when in this position the pin 87 is in the mid portion of the slot 85. The slot is so shaped that at the beginning of rotation of the sectors only a relatively small fore and aft movement of the pin occurs. It is this first movement which effects the engagement of the friction clutches. There is thus provided a relatively high mechanical advantage for the first part of the shifting movement for both high speed and second speed. It will be seen that after this first movement and after synchronization the slot is so shaped as to provide a lesser mechanical advantage and a relatively quick engagement of the jaw teeth. This desirable result is accomplished with no departure from the conventional range of movement of the shift lever.

Although not a part of this invention I have shown at 89 an interlocking plate. It has an opening 91 extending through the upper edge and having sufficient length to accommodate the necessary longitudinal movement of the shift lever. This opening is closed by side edges 93 which are engaged by the lever when it moves transversely. The plate is pivoted as at 95 so that it may swing with the transverse movements of the lever 7. In so swinging its lower end 97 engages that one of the shift forks which is not to be reciprocated by the lever and holds that one from possible reciprocation.

I claim:
1. In a change speed transmission, a shifting element, a member slidable in opposite directions to effect a plurality of gear ratios, structural parts engaged successively by the movement of said member to first frictionally and then positively effect a drive, means connecting said element and slidable member whereby the element moves the slidable member with a relatively high mechanical advantage during that portion of its movement effecting the frictional clutch engagement, and with a lower mechanical advantage during the latter part of the movement of the slidable member during which the positive driving connection is being made.

2. In a change speed transmission, a shifting element, a member slidable in opposite directions to effect a plurality of gear ratios, structural parts engaged successively by the movement of said member to first frictionally and then positively effect a drive, means connecting said element and slidable member whereby the element moves the slidable member with a relatively high mechanical advantage during that portion of its movement effecting the frictional clutch engagement, and with a lower mechanical advantage during the latter part of the movement of the slidable member during which the positive driving connection is being made, said connecting means including geared sectors, one engaged and rotated by said element and the other having a cam engagment with said slidable member.

3. In a change speed transmission, a shifting element, a member slidable in opposite directions to effect a plurality of gear ratios, structural parts engaged successively by the movement of said member to first frictionally and then positively effect a drive, means connecting said element and slidable member whereby the element moves the slidable member with a relatively high mechanical advantage during that portion of its movement effecting the frictional clutch engagement, and with a lower mechanical advantage during the latter part of the movement of the slidable member during which the positive driving connection is being made, said connecting means including geared sectors, one engaged and rotated by said element, the other having a cam slot, a slidable fork to reciprocate said slidable member and pin means carried by said fork and movably mounted in said cam slot.

4. For use in a change speed transmission having a shift lever, slidable forks and a slidable gear engaged by a first one of said forks and operable to effect low and reverse gear ratios when said lever has been moved in a first transverse direction to engage said first fork, a first pivoted sector, a second pivoted sector geared to said first sector, said first sector having a part to be engaged by said shift lever when the latter is moved in a second transverse direction, and whereby the sectors are rotated by a longitudinal movement of said shift lever, said second sector having a cam slot, a pin on the second of said forks engageable on said cam slot whereby the rotation of said sectors may reciprocate said second fork at unequal rates of movement by a uniform movement of the shift lever, and transmission mechanism rendered active by said reciprocation of said second fork.

5. The invention defined by claim 4, said transmission mechanism including a friction drive connection being made by the first part of the movement of said second fork in either direction from its intermediate and neutral position, and a positive driving connection made by the latter part of the movement of the second fork, said cam slot being shaped to afford a greater mechanical advantage during the movement producing the frictional connection.

6. In a change speed transmission, a housing, a first sector pivoted thereto, a second sector also pivoted to said housing and geared to said first sector, a sliding clutch having jaw teeth at its ends, transmission members beyond the ends of the sliding jaw clutch and having co-operating jaw teeth, said transmission members also having friction faces, axially movable friction drums between the ends of the sliding clutch and the said transmission members, the movement of the sliding clutch first moving one friction drum into frictional contact with a co-operating friction face of one of said transmission members and thereafter engaging in toothed relation with said transmission member, a fork to reciprocate said sliding clutch, a pin and cam connection between the fork and the second sector, and means to rotate the first sector.

7. The invention defined by claim 6, said cam shaped to reciprocate said pin at a slower rate during the first part of the uniform movement of the sectors when effecting the frictional engagement than during the latter part of said movement of the sectors when effecting positive toothed engagement.

8. In a change speed transmission having as constituent parts thereof a shifting element and a member shiftable to effect a predetermined driving ratio, connecting mechanism whereby said element may move said member, said connecting mechanism including means having a cam operable upon said member whereby said element moves said member through the instrumentality of said connecting mechanism with a relatively high mechanical advantage during a first part of its movement and with a lesser mechanical advantage during the remainder of its movement.

9. In a change speed transmission having a shifting element and a member reciprocable in opposite directions from an intermediate position to effect a plurality of driving ratios, connecting mechanism whereby said element may reciprocate said member in both directions, said connecting mechanism including means having opposed cam portions operable upon said member whereby said element moves said member through the instrumentality of said connecting mechanism in either direction of movement with a relatively high mechanical advantage during a first part of its movement and with a lesser mechanical advantage during the remainder of its movement.

THOMAS C. VAN DEGRIFT.